United States Patent

[11] 3,623,953

[72] Inventors William P. Cotter;
 Norman E. Lloyd; Charles W. Hinman, all of Clinton, Iowa
[21] Appl. No. 765,654
[22] Filed Oct. 7, 1968
[45] Patented Nov. 30, 1971
[73] Assignee Standard Brands Incorporated
 New York, N.Y.

[54] METHOD FOR ISOMERIZING GLUCOSE SYRUPS
 9 Claims, No Drawings

[52] U.S. Cl. ................................................ 195/31
[51] Int. Cl. ............................................ C21b 1/00
[50] Field of Search .......................... 195/31, 11; 99/141, 142; 127/30

[56] References Cited
FOREIGN PATENTS
1,103,394  2/1968  Great Britain ................ 195/31

OTHER REFERENCES
Pollard, Chemical Abstracts Vol. 57, 010313f
Pieck et al., Chemical Abstracts Vol. 60, 09462h Primary Examiner—A. Louis Monacell
Assistant Examiner—Gary M. Nath
Attorney—Aaron B. Karas ABSTRACT: The present invention is directed to a method for enzymatically isomerizing glucose in glucose-containing liquors. The presence of relatively small amounts of water-soluble salts of sulfurous acid during the enzymatic isomerization of glucose in glucose-containing liquors reduces color formation therein and increases the stability of the glucose-isomerizing enzyme.

METHOD FOR ISOMERIZING GLUCOSE SYRUPS

THE INVENTION

The present invention relates to a process of enzymatically isomerizing glucose in glucose-containing liquors. More particularly, the invention relates to a process of enzymatically isomerizing glucose in glucose-containing liquors whereby color development in the liquors during isomerization is reduced.

The major use of glucose and of corn syrups containing glucose is in food processing, for example in the baking, beverage, canning and confectionery industries, to provide sweetness, body or to regulate crystal growth. However, because glucose inherently lacks a high degree of sweetness and has a relatively bland flavor, its uses are somewhat limited. This is overcome, to some extent, by mixing glucose or corn syrups with sucrose or invert syrups to enhance total sweetness. This has not proven entirely satisfactory, however, because of economic and other factors involved. It has been recognized that if during the production of corn syrups and other glucose-containing syrups a significant proportion of the glucose could be converted to fructose, syrups would be provided that are sweet enough to satisfy additional purposes.

It has long been known in the art that glucose can be converted to fructose by heating a glucose-containing liquor, such as a corn syrup, in the presence of an alkaline catalyst. Because of the nonselectivity of alkaline catalysts various objectionable byproducts are produced, such as large amounts of colored bodies and acidic materials. To refine the alkaline isomerized liquor to remove the objectionable byproducts thereof, requires rather complicated and costly refining procedures. Consequently alkaline isomerization, as far as we know, has not been practiced commercially, due probably, to the economics involved with refining the alkaline isomerized liquor and the relatively poor quality of the resulting product.

Various micro-organsims produce enzymes which isomerize glucose in glucose-containing syrups to fructose. These enzymes are referred to in the art as glucose isomerase. An article appearing in *Science*, Vol. 125, pp. 648-9 (1957) discloses that an enzyme derived from *Pseudomonas hydrophila* will isomerize glucose to fructose. Also British Pat. No. 1,103,394 and Japanese Pat. No. 17,640 (1966) disclose that micro-organisms classified as belonging to the *Streptomyces* genus, such as *Streptomyces flavovirens*, *Streptomyces achromogenes*, *Streptomyces echinatus*, *Streptomyces albus*, and *Streptomyces phaeochromogenes* produce glucose isomerase.

Although glucose-isomerizing enzymes are more selective in converting glucose to fructose than is an alkaline catalyst, there are still a number of problems associated with the commercial use of these enzymes. For example, appreciable quantities of colored bodies are produced during enzymatic isomerization, which make the resulting products difficult to refine. Also there is a tendency for the isomerizing enzyme to be inactivated in a shorter period than is desired. The formation of colored bodies and the inactivation of the isomerizing enzyme are largely dependent upon the conditions under which the isomerization reaction is carried out. If the reaction is performed for relatively long periods of time and/or at high temperatures, in order to obtain high yields of fructose, there will be greater amounts of colored bodies formed and the enzyme will be inactivated to a greater degree.

The purity of the glucose isomerase preparation also affects the formation of colored bodies in the isomerized liquor. If relatively large amounts of extraneous materials are present in the glucose isomerase preparation, there is a greater tendency for larger amounts of colored bodies to be formed.

It is the principal object of the present invention to provide an enzymatic method of isomerizing glucose in glucose-containing liquors whereby the formation of colored bodies in the liquors during isomerization is reduced.

This object, and other objects of the present invention which will be apparent from the following description, are attained by providing a glucose-isomerizing enzyme in a glucose-containing liquor and subjecting the liquor to isomerizing conditions, there being present in the glucose-containing liquor during isomerization a small amount of a water-soluble salt of sulfurous acid sufficient to measurably reduce the formation of colored bodies below that level obtained by carrying out the enzymatic isomerization without the presence of the water-soluble salt of sulfurous acid.

Although the present method does not completely eliminate the formation of colored bodies, hereinafter referred to as color, during isomerization, the small amount of color which is produced may be removed by relatively simple refining procedures.

In the process of the present invention, the salts of sulfurous acid may be provided in the glucose-containing liquors by any convenient method. For instance, sulfite or bisulfite salts, or other substances which will generate sulfite or bisulfite ions, e.g., $SO_2$ or $H_2SO_3$ solution, may be incorporated directly into the glucose-containing liquor before the isomerization process is carried out or may be incorporated into the liquor during isomerization. Also sulfite or bisulfite ions may be provided in the glucose-containing liquors by passing such liquors through ion exchange resins in the sulfite form. Preferably, however, the bisulfite and sulfite salts are provided in the glucose-containing liquors before the isomerization process is initiated since the full benefit of the presence of these salts will thereby be obtained.

The preferred micro-organisms used to produce glucose isomerase for use in the present isomerization process are those belonging to the *Streptomyces* genus. The most preferred micro-organism is *Streptomyces* sp. ATCC 21175. The taxonomical characteristics of this micro-organism are shown below.

TAXONOMICAL CHARACTERISTICS OF STREPTOMYCES SP. ATCC 21175

A. Morphological Observations

1. Spiral sporophores making 3 to 6 turns; a few incompleted sporophores forming hooks and loops.

Culture Medium: Yeast extract-malt extract agar; oatmeal agar; glycerol-asparagine agar; glycerol-starch-glutomate agar; yeast extract-glucose agar; tyrosine agar; glycerine synthetic agar; calcium malate-glycerine agar; nutrient potato agar; potato plug.

2. 10 to 50 spores in sporophores " " " " " —
3. Mycelium nonfragmenting " " " " " "
4. Spores surface spiny when viewed in an electron microscope at magnifications above 1,000X; spores round or slightly elliptical " " " " " "

B. Color of Colony

The most representative color of the spores and aerial mycelia "en masse" on the surface of mature colonies is beige brown or mist brown, matching color tab 3 ig on the Tresner-Backus color wheel.

C. Reverse Side of Colony

No distinctive pigmentation. Gray or brownish yellow on yeast extract-malt extract agar, oatmeal agar and starch agar.

D. Color in Medium

No pigment formed.

E. Carbon Utilization

L-arabinose, D-fructose, i-inositol, D-mannitol, rhamnose, and D-xylose are utilized for growth. No growth on sucrose and raffinose.

F. Other Physiological Properties

Growth is strictly aerobic, mesophilic. No growth at 50° C. on yeast extract-malt extract agar. Proteolytic activity-positive on Gordon and Smith casein agar. Diastatic activity-positive on inorganic salts-starch agar. Volatile compounds with earthy or moldy odor are produced during the active growth of the culture on most media.

Another preferred micro-organism belonging to the *Streptomyces* genus used to produce glucose isomerase is *Streptomyces* sp. ATCC 21176.

Since glucose isomerase is primarily produced intracellularly by these micro-organisms, a source of glucose isomerase may be provided by simply harvesting the cells from the growth media. The glucose isomerase may be separated from the cells of these micro-organisms by techniques known in the art, i.e., sonic treatment, etc., and used to isomerize glucose in a glucose-containing liquor to fructose or the cellular material may be used directly. When cellular material is used there is the tendency for more color and other objectionable byproducts to be produced because of the extraneous materials which are present along with the glucose isomerase, than when separated and purified glucose isomerase is used. However, the techniques necessary to separate the glucose isomerase are generally time consuming and involve added expense. Because of this the present process is particularly applicable to suppression of color formation when an enzymatic isomerization reaction is carried out using as a source of the glucose isomerase cellular material. Since, generally during the enzymatic isomerization there is required as enzyme activators, salts of magnesium, cobalt, chromium, and/or manganese, these salts of sulfurous acid are preferred. In the case of *Streptomyces* sp. ATCC 21175 the preferred salt is magnesium sulfite.

The preferred pH range for performing the enzymatic isomerization reaction is from about 6.0 to about 8.5 with a pH range of from about 6.5 to about 7.5 being most preferred. The temperature of the glucose-containing liquor during isomerization may vary widely, although it is preferred that the glucose-containing liquor be at a temperature of from about 45° to about 80° C. during the isomerization reaction, and most preferably be at a temperature of from about 50° to about 65° C.

The amount of bisulfite or sulfite salts provided in the glucose-containing liquor may vary, but under the preferred conditions of the present invention sufficient amounts of these salts are added to provide an $SO_2$ content in the liquor of from about 0.02 to about 0.3 percent by weight based on the dry substance content of the liquor, and most preferably from about 0.03 to about 0.07 percent by weight on the same weight basis. Although at greater concentrations of $SO_2$ there will be a relatively long period during the isomerization reaction when less color is produced, than in the case of an isomerization reaction without the presence of sulfites or bisulfites, after this initial period the rate of color formation will increase very rapidly until the color formed will exceed that formed when the isomerization reaction is carried out without the presence of sulfites or bisulfites. Therefore when these salts are used, the isomerization reaction should be terminated before the color formed reaches a point where the subsequent removal thereof is difficult.

Although the glucose-isomerizing enzyme is relatively stable at high temperatures it is subject to thermal denaturation normal to all proteins. The presence of the sulfite salts during the isomerization reaction, especially at high isomerization temperatures, surprisingly exerts a protective effect towards the glucose-isomerizing enzyme. This provides the benefit that lesser quantities of the enzyme are needed to achieve the same yield of fructose when sulfites or bisulfites are present, or conversely for the same quantity of enzyme, higher yields of fructose can be obtained.

In order to more clearly describe the nature of the present invention specific examples will hereinafter be described. It should be understood, however, that this is done solely by way of example and is intended neither to delineate the scope of the invention nor limit the ambit of the appended claims. In the examples and throughout the specification, percentage refers to percent by weight and is based on the dry substance weight of the glucose-containing liquor unless otherwise specified.

The analytical methods referred to in the following examples were performed as follows:

The color of the glucose-containing liquor was determined spectrophotometrically by measuring the absorbance at 450 m$\mu$ and 600 m$\mu$ of an appropriately diluted liquor in a 1 cm. cell versus water as a reference. The spectrophotometer was a Beckman DK-2A, manufactured by Beckman Instrument Co. The color was calculated by using the following formula:

$$\text{Color} = \frac{(100)(109)(A_{450} - A_{600})}{C}$$

$A_{450}$ = absorbance at 450 m$\mu$
$A_{600}$ = absorbance at 600 m$\mu$
$C$ = concentration in grams of dry substance per 100 ml. of liquor.

$SO_2$ CONCENTRATION IN THE GLUCOSE-CONTAINING LIQUOR

Sulfur dioxide in the liquors was determined as follows: A sample of the liquor in the range of 50–60 g. was weighed accurately into a dish and transferred quantitatively into an 800 ml. Kjeldahl flask employing 300 ml. of distilled water. Ten ml. of concentrated phosphoric acid was added followed by 1 g. of sodium bicarbonate. The flask was immediately connected to a standard Kjeldahl distillation apparatus and approximately 250 ml. distilled into a Erlenmeyer flask containing 25 ml. of water and 10–12 ml. of 0.8 percent sodium hydroxide solution. When the distillation was complete, the distillate was acidified with phosphoric acid and 2 ml. of starch paste indicator added. The solution was then titrated with 0.0625N iodine solution (1 ml. equivalent to 0.002 g. of $SO_2$) until a blue color persisted for 1 minute. Percent $SO_2$ dry basis was calculated as follows:

$$\text{Percent } SO_2 = \frac{\text{titre(ml.)} \times 0.002}{\text{Sample wt. (g.)} \times \text{Dry Substance (percent)}}$$

Fructose content of the isomerized liquor was determined by measuring the change in specific rotation which occurred during isomerization. Specific rotations were measured using a Bendix Corporation NPL Model 969 Automatic Polarimeter. The rotations were determined at a concentration of 5 g./100 ml. in a glass cell thermostated at 25° C. Path of the cell was 20 mm. The specific rotations were determined at the beginning of the isomerization reactions after all ingredients in the isomerization reaction mixtures had been combined. To determine change in fructose content the specific rotation of the isomerized liquor at time $t$ was determined. All samples were adjusted to pH 4.0 with dilute hydorchloric acid in order to halt enzyme action before dilution for determination of rotations. Change in fructose content was calculated by using the following formula:

$$\text{Percent } F = \frac{100(\alpha_t - \alpha_0)}{-138.9}$$

$\alpha_0$ = specific rotation at start of isomerization
$\alpha_t$ = specific rotation at time $t$ In the formula the factor −138.9 is the change in specific rotation which occurs when glucose is converted completely to fructose.

GLUCOSE ISOMERASE ACTIVITY

The determination of glucose isomerase activity of the enzyme preparation is based on a modification of a method disclosed by Takasaki in *Japanese Journal of Agr. Biol. Chem.*, Vol. 30, NO. 12, pp. 1,247–1,253, using Technicon AutoAnalyzer equipment. The activity of the standard enzyme used to calibrate the automated procedure was determined by the method of Takasaki, with the exception that the activity was determined at pH 7.5 instead of 7.2. Thus the definition of a glucose isomerase unit (GIU) is that amount of enzyme which under the test conditions (pH 7.5, 70° C., 1 hour, test solution 0.1M in D-glucose, 0.005M in magnesium sulfate, and 0.05M in pH 7.5 phosphate buffer) will produce 1 mg. of D-fructose per hour. Fresh cells and dry cells were suspended in distilled water and sonicated with a Branson Model S75 sonifier for 2-3 minutes in order to destroy the cell structure and release the enzyme into the liquid phase. The sonicates were centrifuged and appropriate aliquots of the clear supernate taken and diluted to the proper range (0–20 GIU/ml.) for assay by the automated method.

EXAMPLE I

This example illustrates the enzymatic isomerization of glucose in glucose-containing liquors in the presence and absence of sulfite salts.

Streptomyces sp. ATCC 21175 was grown under aerobic submerged fermentation conditions at a pH of 7 in a presterilized aqueous medium containing 1 percent sorbitol, 0.75 percent dextrose, sufficient corncob hydrolysate to provide 1 percent xylose, 4 percent steep water at 29° B. and 0.024 percent cobaltous ion. The fermentation was carried out at 30° C., an airflow of 1 volume of air per volume of medium per minute and a back pressure of 10 p.s.i. The fermenting broth was mechanically stirred at 200 r.p.m. and after 65 hours 4 percent filter aid was admixed into the broth and the cellular material harvested from the broth by filtration with suction. The filter cake was washed with demineralized water, broken into small pieces and dried for 5 hours in a forced-air oven at an air temperature of 140° F. The activity of the air-dried filter cake was 660 GIU/g.

A series of four glucose-containing liquors prepared from hydrolysates of cornstarch were prepared having the compositions shown in the following table:

TABLE I

| | Sample | | | |
|---|---|---|---|---|
| | 1 | 2 | 3 | 4 |
| Glucose content (percent dry basis) | 55.5 | 55.5 | 55.5 | 67.5 |
| $CoCl_2 \cdot 6H_2O$ (molarity) | 0.001 | 0.001 | 0.001 | 0.001 |
| $Na_2SO_3$ (percent dry basis) | 0.25 | | | |
| $MgCl_2 \cdot 6H_2O$ (molarity) | 0.005 | | 0.005 | |
| $MgSO_3 \cdot H_2O$ (percent dry basis) | | 0.25 | | 0.25 |
| Total $SO_2$ (percent dry basis) | 0.13 | 0.12 | none | 0.12 |
| Glucose Isomerase (GIU/g. dry basis) | 2.3 | 2.3 | 2.3 | 4.6 |

These samples were isomerized at a temperature of 70° C. for 92 hours with the pH thereof being maintained at 6.5 by the addition of a 0.5-percent solution of sodium hydroxide. An atmosphere of nitrogen was maintained over the three samples which contained the sulfites. The color and the fructose content of the liquors were determined throughout the isomerization. The results of these determinations are shown in table II.

TABLE II

| | Sample Number | | | | | | | |
|---|---|---|---|---|---|---|---|---|
| | 1 | | 2 | | 3 | | 4 | |
| Isomerization time (hours) | Percent fructose | Color | Percent fructose | Color | Percent fructose | Color | Percent fructose | Color |
| 0 | 0 | 6 | 0 | 6 | 0 | 6 | 0 | 7 |
| 8 | 2.9 | 9 | 5.4 | 9 | 3.4 | 11 | 9 | 9 |
| 20 | 9.4 | 10 | 12.1 | 11 | 8.3 | 36 | 18 | 10 |
| 26 | 9.8 | 7 | 12.7 | 8 | 7.4 | 53 | 20.2 | 6 |
| 44 | 16.7 | 10 | 19.1 | 14 | 13.2 | 96 | 26.8 | 17 |
| 68 | 21.0 | 17 | 22.1 | 71 | 14.6 | 251 | 30.5 | 211 |
| 92 | 25.0 | 98 | 25.3 | 409 | 17.5 | 434 | 32.5 | 707 |

As seen from table II, as the amount of fructose increased the color of the isomerized liquor also increased. In each of the isomerization reactions carried out in the presence of sulfites less color was formed than in the liquor which contained no sulfites on an equal fructose formed basis. Also it is seen that more fructose formed in the samples containing the sulfite salts indicating that the sulfites reduced the degree of inactivation of the enzyme during the isomerization reaction.

EXAMPLE II

This example illustrates the enzymatic isomerization of glucose in glucose-containing liquors using various amounts of glucose isomerase in the presence of various amounts of sulfites.

Two series of four glucose-containing liquor samples (mother liquor from primary dextrose cyrstallization, 90DE) were prepared containing 0.005M magnesium chloride and 0.001M cobalt chloride. Series A contained 53.4 percent dry substance, and Series B contained 56.7 percent dry substance. To the samples, were added various quantities of the air-dried filter cake of example I and sulfite salts. The isomerizations were carried out at 70° C. for various times under an atmosphere of nitrogen. The color and fructose formed during the isomerization reactions were determined and are shown below in table III.

TABLE III

| Sample | Percent $Na_2SO_3$ | Percent $NaHSO_3$ | Total $SO_2$ | Isomerization time, hours | Percent fructose | Color |
|---|---|---|---|---|---|---|
| Series A (4.2 GIU/g. of dry substance) | | | | | | |
| 1 | 0.05 | | 0.025 | 0 | 0 | |
| | | | | 17 | 12.9 | 11 |
| | | | | 29 | 19.3 | 35 |
| | | | | 41 | 24.8 | 70 |
| | | | | 66 | 31.9 | 157 |
| | | | | 90 | 36.8 | 297 |
| | | | | 114 | 35.8 | 410 |
| 2 | 0.05 | 0.05 | 0.054 | 0 | 0 | |
| | | | | 17 | 14.9 | 3 |
| | | | | 29 | 22.6 | 8 |
| | | | | 41 | 26.9 | 84 |
| | | | | 66 | 33.0 | 310 |
| | | | | 90 | 36.4 | 477 |
| | | | | 114 | 36.9 | 647 |
| 3 | 0.075 | 0.075 | 0.081 | 0 | 0 | |
| | | | | 17 | 14.4 | 4 |
| | | | | 29 | 20.8 | 7 |
| | | | | 41 | 26.4 | 17 |
| | | | | 66 | 31.8 | 291 |
| | | | | 90 | 35.8 | 511 |
| | | | | 114 | 35.8 | 645 |
| 4 | 0.10 | 0.10 | 0.108 | 0 | 0 | |
| | | | | 17 | 14.0 | 4 |
| | | | | 29 | 20.4 | 3 |
| | | | | 41 | 26.2 | 6 |
| | | | | 66 | 32.7 | 130 |
| | | | | 90 | 36.3 | 470 |
| | | | | 114 | 37.4 | 640 |
| Series B (8.5 GIU/g. of dry substance) | | | | | | |
| 1 | 0.05 | | 0.025 | 0 | 0 | 6 |
| | | | | 14 | 21.3 | 15 |
| | | | | 25.5 | 30.6 | 54 |
| | | | | 38 | 35.5 | 128 |
| | | | | 62 | 39.2 | 264 |
| | | | | 92 | 40.5 | 550 |
| 2 | 0.05 | 0.05 | 0.054 | 0 | 0 | 5 |
| | | | | 14 | 20.0 | 9 |
| | | | | 25.5 | 29.5 | 12 |
| | | | | 38 | 34.7 | 58 |
| | | | | 62 | 39.5 | 323 |
| | | | | 92 | 40.5 | 684 |
| 3 | 0.075 | 0.075 | 0.081 | 0 | 0 | 4 |
| | | | | 14 | 21.5 | 8 |
| | | | | 25.5 | 30.7 | 7 |
| | | | | 38 | 35.8 | 24 |
| | | | | 62 | 39.7 | 296 |
| | | | | 92 | 41.0 | 745 |
| 4 | 0.10 | 0.10 | 0.108 | 0 | 0 | 4 |
| | | | | 14 | 20.5 | 7 |
| | | | | 25.5 | 29.1 | 7 |
| | | | | 38 | 35.4 | 14 |
| | | | | 62 | 39.3 | 147 |
| | | | | 92 | 41.0 | 606 |

From table III, it is apparent that generally at comparable fructose levels increasing sulfite content resulted in less color being produced. Also, the user of higher levels of glucose isomerase results in lower colors at comparable fructose and sulfite levels.

EXAMPLE III

This example illustrates the use of ion exchange resins to provide sulfite ions in a glucose-containing liquor and the enzymatic isomerization of the glucose-containing liquor.

A glucose-containing liquor (mother liquor from primary dextrose crystallization, 90DE) containing 60 g. dry substance per 100 ml. and having a color of 8 was heated to 70° C. and sufficient magnesium chloride and cobalt chloride added to provide a molar concentration therein of 0.005 and 0.001, respectively. One-tenth of 1 percent sodium bisulfite was added and the pH of the liquor was adjusted to 6.5 with dilute sodium hydroxide. A sufficient amount of dried filter cake of *Streptomyces* sp. ATCC 21175 prepared according to example I was added to provide 9.0 GIU/g. dry substance. The liquor was isomerized for 24 hours at a temperature of 70° C., and the pH during the isomerization was maintained at 6.5 by the addition of a dilute sodium hydroxide solution. The fructose content and the color were determined after 22 hours and were 33.8 percent and 18, respectively. After 24 hours the isomerized liquor was filtered and divided into four 400 ml. portions each of which contained 233 g. dry substance. Each portion was passed separately through ion exchange columns containing various amounts of Dowex 11 resin (manufactured by Dow Chemical Co.) in the sulfite form. After ion exchange treatment, the pH of the portions was adjusted to 6.5 with a dilute solution of sodium hydroxide and sufficient cobalt chloride added to give a molar concentration of 0.005. The temperature of the portions was maintained at 70° C. and at a pH of 6.5 by adding during the isomerization a dilute sodium hydroxide solution. The color and the fructose content during the isomerization reaction were determined and are shown in table IV.

suspending in water and centrifuging. This water solution containing the enzyme was dialyzed continuously against 10 gallons of demineralized water at 3° C. The dialysate was concentrated to 136 g. and was then lyophilized to obtain 15.9 g. of purified glucose isomerase preparation having an activity of 14,400 GIU/g.

Two isomerization mixtures were prepared having the following composition:

3.0M glucose 0.001M cobalt chloride 0.005M magnesium chloride

Sufficient purified glucose isomerase preparation was added to provide 11.4 GIU/g. glucose. To one of these isomerization mixtures was added enough sodium bisulfate to make it 0.005M in respect to this salt (0.096 percent $SO_2$). The mixtures were maintained under nitrogen atmosphere at pH 6.5 and 70° C. Aliquots were removed at the start of the isomerization and after 20, 44 and 92 hours the fructose and color determined. The results of these determinations are shown in table V.

Also shown in table V are residual glucose isomerase activities at the various sampling times. The residual enzyme activities in Table V were determined as follows:

A test solution was prepared by mixing 25 ml. of isomerate with 25 ml. of a stock solution which was 3M in glucose, 0.2M in pH 6.5 sodium maleate buffer, 0.02M in magnesium sulfate, and 0.001M in cobalt chloride. The test solution was placed in a water-jacketed polarimeter cell (20 mm. path). Hot water was circulated through the jacket to maintain the contents of the cell at 70° C. The cell was placed in a Bendix Automatic polarimeter equipped with a recorder and the rate of change in optical rotation determined. From the rate of change in optical rotation, the rate of formation of fructose ($V_f$) catalyzed

TABLE IV

| Sample | Sample description | Isomerization time, hours | Cubic feet of pound of dry resin per pound of dry substance processed (×10⁴) | Percent fructose | Color |
|---|---|---|---|---|---|
| | Initial isomerization | 6 | | | 8 |
| | | 22 | | 33.8 | 18 |
| | | 24 | 25.0 | 35.8 | 7 |
| 1 | After treatment w/ion exchange resin | 42 | 25.0 | 39.8 | 10 |
| | | 66 | 25.0 | 41.6 | 31 |
| | | 72 | 25.0 | 42.8 | 63 |
| | | 24 | 12.5 | 35.8 | 9 |
| 2 | do | 42 | 12.5 | 40.2 | 15 |
| | | 66 | 12.5 | 42.0 | 72 |
| | | 72 | 12.5 | 42.9 | 173 |
| | | 24 | 8.3 | 36.0 | 10 |
| 3 | do | 42 | 8.3 | 40.0 | 15 |
| | | 66 | 8.3 | 41.8 | 99 |
| | | 72 | 8.3 | 43.7 | 234 |
| | | 24 | 6.3 | 35.6 | 9 |
| 4 | do | 42 | 6.3 | 40.2 | 18 |
| | | 66 | 6.3 | 41.8 | 157 |
| | | 72 | 6.3 | 43.8 | 306 |

EXAMPLE IV

This example illustrates the stabilizing effect of sulfite ions on the glucose-isomerizing enzyme under the conditions of an isomerization reaction.

475 g. of dried filter cake prepared as in example I was suspended in a sufficient amount of 0.005M cobalt chloride solution to obtain 5 liters. The suspension was adjusted to pH 6.25 and 58° C. and maintained with stirring at these conditions for 6 hours. The suspension was then cooled to room temperature and filtered to obtain a cell-free extract. The cell-free extract was concentrated tenfold using a Rinco rotary evaporator. 383 g. of the concentrated cell-free extract was placed in a breaker and the temperature lowered to 1° C., and 255 g. of acetone added with stirring to form a precipitate. After 15 minutes, the precipitate was removed by centrifugation at 2,000 r.p.m. and was extracted twice with water by by the residual glucose isomerase was calculated. The residual enzyme activity per gram of dry substance ($E/C_i$) contained in the isomerate was then calculated according to the following equation:

$$E/C_i = \frac{V_f(K_s + C - F(1 - K_s/K_p))(C_i + C_s)}{C_s k_f(C - F(1 + 1/K_s))(C_i)}$$

$V_f$ = rate of fructose formation in moles liter⁻¹ hr⁻¹.

$C$ = total concentration of glucose and fructose in moles per liter.

$F$ = concentration of fructose in moles per liter.

$C_s$ = concentration of dry substance (g./ml.) in test solution.

$k_f$ = pseudo-first-order rate constant for the breakdown of enzyme-glucose complex to enzyme plus fructose (equal to 0.012 moles fructose liter⁻¹ hr⁻¹ GIU⁻¹ at pH 6.5 and 70° C.).

$K_s$ = Michael is constant for substrate 0.580M glucose at pH 6.5 and 70° C.).
$K_p$ = Michaelis constant for product (0.936M fructose at pH 6.5 and 70° C.).
$K_a$ = apparent equilibrium constant for the reaction (1.094 at 70° C.).
$C_i$ = concentration of dry substance (g./ml.) in isomerate.
$C_s$ = concentration of dry substance (g./ml.) in stock solution.

Referring to table V it is seen that of the 20 GIU/g. added to the isomerates, 99 and 98 percent were recovered in the 0-hour samples as measured by the above technique. At the end of 80 hours the isomerate containing the sulfite salt retained 29 percent of the original enzyme activity whereas the sample containing no sulfite had only 13 percent residual activity.

TABLE V

| NaHSO₃ | Isomerization time, hours | Percent fructose | Color | Enzyme dry substance ratio in isomerate (GIU/g.) | Residual activity (percent of that added) |
|---|---|---|---|---|---|
| None | 0 | 0.0 | 7 | 19.8 | 99 |
|  | 20 | 30.3 | 27 | 15.6 | 78 |
|  | 44 | 43.4 | 132 | 9.8 | 49 |
|  | 92 | 48.5 | 514 | 2.6 | 13 |
| 0.005M | 0 | 0.0 | 3 | 19.6 | 98 |
|  | 20 | 29.1 | 5 | 16.2 | 81 |
|  | 44 | 44.3 | 10 | 11.1 | 56 |
|  | 92 | 50.1 | 318 | 5.7 | 29 |

What is claimed is:

1. A process for enzymatically isomerizing glucose in a glucose-containing liquor to fructose comprising providing a glucose-isomerizing enzyme in a glucose-containing liquor and subjecting the liquor to isomerizing conditions, there being present in the glucose-containing liquor during isomerization a small amount of a water-soluble salt of sulfurous acid sufficient to measurably reduce the formation of color bodies below that level obtained by carrying out the enzymatic isomerization without the presence of the water-soluble salt of sulfurous acid.

2. A process for enzymatically isomerizing glucose in a glucose-containing liquor to fructose as defined in claim 1, wherein the amount of a water-soluble salt of sulfurous acid provided in the glucose-containing liquor during isomerization is sufficient to provide a level of $SO_2$ in the liquor of from about 0.02 to about 0.3 percent by weight based on the dry substance content of the liquor.

3. A process for enzymatically isomerizing glucose in a glucose-containing liquor to fructose as defined in claim 2, wherein the amount of a water-soluble salt of sulfurous acid provided in the glucose-containing liquor during isomerization is sufficient to provide a level of $SO_2$ in the liquor of from about 0.03 to 0.08 percent by weight based on the dry substance content of the liquor.

4. A process for enzymatically isomerizing glucose in a glucose-containing liquor to fructose as defined in claim 2, wherein the glucose-isomerizing enzyme is produced from a micro-organism of the *Streptomyces* genus.

5. A process for enzymatically isomerizing glucose in a glucose-containing liquor to fructose as defined in claim 4, wherein cellular material containing glucose-isomerizing enzyme is provided in the liquor.

6. A process for enzymatically isomerizing glucose in a glucose-containing liquor to fructose as defined in claim 5, wherein the pH of the glucose-containing liquor during isomerization is maintained at a value from about 6.5 to about 7.5.

7. A process for enzymatically isomerizing glucose in a glucose-containing liquor to fructose as defined in claim 6, wherein the temperature of the glucose-containing liquor during isomerization is maintained at a level of from about 50° to about 65° C.

8. A process for enzymatically isomerizing glucose in a glucose-containing liquor to fructose as defined in claim 7, wherein the glucose-isomerizing enzyme is produced from Streptomyces sp. ATCC 21175 or Streptomyces ATCC 21176.

9. A process for enzymatically isomerizing glucose in a glucose-containing liquor to fructose as defined in claim 8, wherein the water-soluble salt of sulfurous acid provided in the glucose-containing liquor during isomerization is selected from the group consisting of magnesium sulfite, magnesium bisulfite and mixtures thereof.

* * * * *